United States Patent [19]

Graham

[11] Patent Number: 4,562,469

[45] Date of Patent: Dec. 31, 1985

[54] METHOD AND APPARATUS FOR ALIGNING TRAPS IN A TELEVISION RECEIVER

[75] Inventor: Timothy J. Graham, Hartford, S. Dak.

[73] Assignee: Sencore, Inc., Sioux Falls, S. Dak.

[21] Appl. No.: 512,178

[22] Filed: Jul. 11, 1983

[51] Int. Cl.⁴ .......................................... H04N 7/02
[52] U.S. Cl. .................................... 358/139; 358/10
[58] Field of Search ................... 358/139, 191.1, 197, 358/10; 455/340, 341, 226

[56] References Cited

U.S. PATENT DOCUMENTS 3,984,862  10/1976  Volz .................................... 358/139

Primary Examiner—Howard W. Britton
Assistant Examiner—Victor R. Kostak
Attorney, Agent, or Firm—Edmond T. Patnaude

[57] ABSTRACT

A video carrier, which is amplitude modulated with a fixed video pattern signal, and sync and blanking signals, is combined with an amplitude modulated I.F. trap frequency signal and supplied to the input of the I.F. stages of a television receiver to cause the video pattern to be displayed on the screen of the receiver, which pattern will exhibit interference until the I.F. trap corresponding to the applied I.F. frequency is set precisely at the applied I.F. frequency.

9 Claims, 3 Drawing Figures

METHOD AND APPARATUS FOR ALIGNING TRAPS IN A TELEVISION RECEIVER

The present invention relates in general to the art of tuning the traps in a telecommunication system, and it relates in particular to a new and improved method and apparatus for use in aligning the I.F. stages of a television receiver.

BACKGROUND OF THE INVENTION

When aligning the I.F. strip of a television receiver, it is initially necessary to determine if each of the traps is properly set, and if they are not, to adjust them to the respective I.F. frequencies which they are required to trap, i.e., the sound I.F. carrier frequency of the same respective channel; the video I.F. carrier frequency of the next higher channel, and the sound I.F. carrier frequency of the next lower channel. Prior to the present invention the usual procedure for performing this test utilized a sweep and marker generator and required that the AGC circuit of the television receiver under test be clamped. Several cables had to be connected into the circuits of the television receiver, and an oscilloscope was required to monitor the output of the video detector of the television receiver.

SUMMARY OF THE INVENTION

Briefly, in accordance with the present invention a composite signal made up of a video I.F. carrier modulated with a video pattern signal and with certain video control signals, and an interfering I.F. carrier having a frequency at the desired trapping frequency of one of the I.F. traps, is applied to the input of the I.F. strip of the television receiver under test to produce a recognizable pattern on the screen of the receiver, which pattern will include visually apparent interference unless the one of the I.F. traps in the I. F. strip for trapping the interfering I.F. signal is set at the frequency of that I.F. signal.

In a preferred embodiment of the invention, the video carrier is modulated with video sync pulses and with blanking pulses thereby to provide automatic clamping of the AGC circuit, and means are provided for selecting I.F. carrier signals at each of the usual interfering I.F. frequencies for use in checking and tuning each of the I.F. traps while observing the pattern on the display screen of the television receiver. To enchance the visible interference pattern on the screen, means are provided for modulating the selected I.F. carrier with a high frequency signal. Also, the level of the modulated I.F. carrier is adjustable to optimize the sensitivity of the trap adjustments inasmuch as too low a level will impair the adjustment while too high a level will overdrive the receiver.

GENERAL DESCRIPTION OF THE DRAWINGS

The present invention will be better understood by a reading of the following detailed description taken in connection with the accompanying drawing wherein.

DETAILED DESCRIPTION OF A PREFERRED EMBODIMENT OF THE INVENTION

In order to prevent the audio portion of the selected television signal from interfering with the detected video signal, the video I.F. strip commonly includes a trap which should be tuned to a frequency of 41.25 Mhz. In order to prevent the video portion of the signal on the next lower channel from interfering with the detected video signal, a trap tuned to 39.75 Mhz is provided, and a trap tuned to 47.25 Mhz is provided to prevent the audio portion of the signal on the next higher channel from interfering with the detected video signal.

In accordance with the method of the present invention, each of these three traps is tested and fine tuned by applying to the input of the I.F. stages of the television receiver a composite test signal including two RF carrier signals. One of these R.F. signals is a carrier at the video carrier intermediate frequency of 45.75 Mhz amplitude modulated with any suitable video pattern and with sync and blanking pulses. The other is an interfering signal at the I.F. frequency of the particular trap to be tested and tuned. It is preferably amplitude modulated with a high frequency pattern interference signal. If the I.F. trap in question is not functioning properly, the interfering I.F. signal will appear on the screen of the reciever as beats in the displayed pattern. While observing the screen the technician can adjust the trap in question until the interference in the pattern is minimized. Preferably, the core of the trap is rocked back and forth to find the exact position where a null occurs in the noise and the pattern displayed on the screen shows no interference.

In accordance with a further aspect of the invention the level of the interfering I.F. signal is adjusted by the technician to opitmize the visibility of the interference beats in the picture displayed on the screen of the receiver. Also, the frequency of the interference signal modulated on the I.F. carrier may be varied to improve the visibility of the interfering signal in the particular pattern being displayed.

After one trap has been tuned in the above manner another trap can be similarly tested and, if necessary, tuned by changing the frequency of the carrier of the interfering I.F. signal to that of the next trap to be adjusted. The process may again be repeated until all of the traps have been tested and properly tuned.

Figure 1:
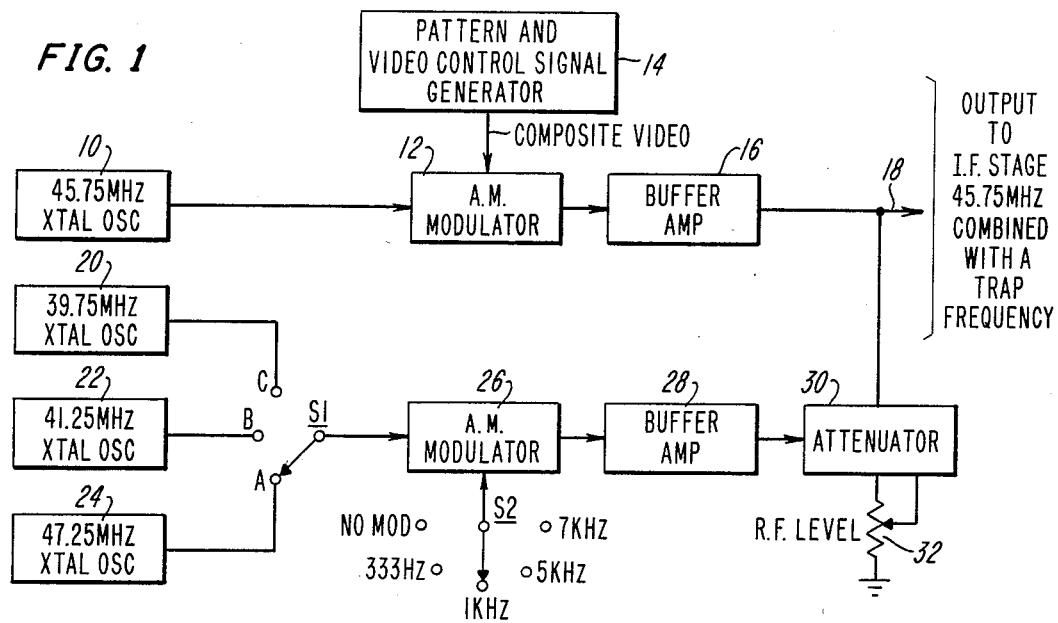
FIG. 1 is a block diagram of a circuit for generating a composite signal for use in aligning the video I.F. stages of a television receiver.

Referring to FIG. 1 there is shown a test signal generator for use in carrying out the method of the present invention for testing and adjusting the I.F. traps in a television receiver. As there shown, a crystal controlled oscillator 10 generates a signal at a frequency at 45.75 Mhz, the standard video carrier frequency. This signal is mixed in an A.M. modular 12 with a video pattern signal and standard sync and blanking pulses from a suitable pattern generator 14. The modulated video carrier signal from the modulator 12 is coupled through a buffer amplifier 16 to the output 18 of the generator. The remainder of the circuit, which is described below, is used to generate interfering signals at each of the three trap frequencies.

As shown, a crystal controlled oscillator 20 generates a signal having a frequency of 39.75 Mhz, the I.F. video carrier frequency of the next higher channel. A crystal controlled oscillator 22 generates a signal having a frequency of 41.25 Mhz, the I.F. sound carrier frequency. Another crystal controlled oscillator 24 generates a signal having a frequency of 47.25 Mhz, the I.F. sound carrier frequency of the next lower channel. The outputs from the oscillators 20, 22 and 24 are connected to respective ones of the contacts A, B and C of a selector switch S1 whose wiper is connected to the high frequency input of an A.M. modulator 26. The other input of the modulator 26 is connected to the wiper of a selector switch S2 whose contacts are connected to sources (not shown) of different video frequency signals. These latter signals are at frequencies of 333 Hz, 1Khz, 5Khz and 7Khz. In addition, one of the contacts of the switch S2 is open. For most purposes, best results will be obtained when the three different I.F. carrier signals are modulated with an interfering video signal having a frequency of 1Khz.

The video modulated output from the modulator 26 is amplified by a buffer amplifier 28 and applied to the input of an attenuator 30. A potentimeter 32 may be used to adjust the R.F. level of the output from the attenuator 30 which is added to the modulated video carrier signal from the buffer amplifer 16 to provide a composite test signal incuding a video modulated video carrier and an interference I.F. signal modulated with a selected video interference signal.

Figure 2:
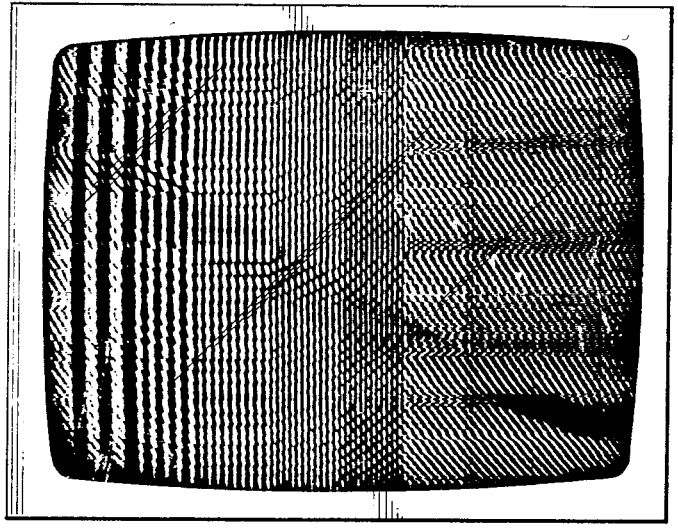
FIG. 2 is a view of the screen of a television receiver under test, the displayed pattern showing interference resulting from an improperly tuned I.F. trap in the receiver.
Figure 3:
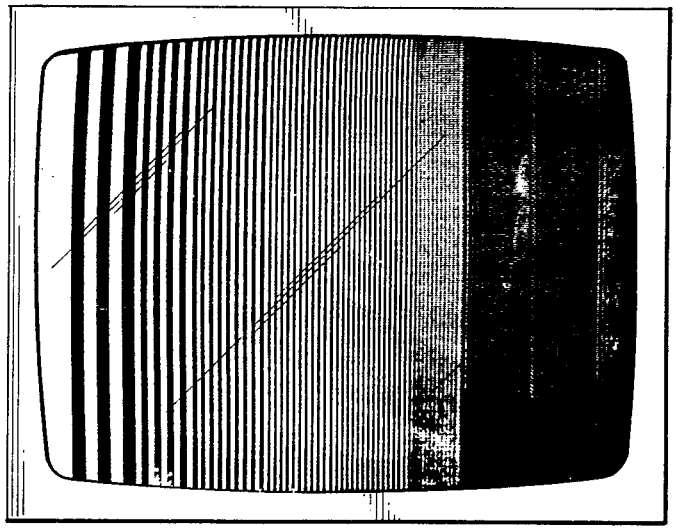
FIG. 3 is a view similar to that of FIG. 2, but showing the same pattern when the I.F. trap in question is properly tuned.

The pattern generated by the pattern generator may be of any type which is readily discernable on the television screen. For example, a Ten Bar Multiburst pattern as shown in FIGS. 2 and 3 may be used. A color bar pattern also provides satisfactory results.

OPERATION

In order to adjust the traps in the I.F. strip of a television receiver, the output line 18 is connected to the input of the first I.F. stage of the receiver. In many television receivers an I.F. input jack is mounted to the tuner of the receiver and may be conveniently used for this purpose.

With the receiver in operation, the wiper of the selector switch is placed in contact with contact element C. Assuming the generator 14 provides a ten bar multiburst pattern signal and the 39.75 Mhz trap is not properly tuned, the pattern shown in FIG. 2 will appear on the screen of the receiver. It may be seen that the interference beat pattern between the pattern signal and the interfering high frequency signal is clearly visible. The core of the 39.75 Mhz trap should then be adjusted until the interference or noise pattern is completely eliminated or at least minimized. In order to assure that the trap is optimally adjusted, the potentiometer 32 should be adjusted so that as the core of the trap is rocked back and forth the interference beat pattern decreases to a minimum and then increases from the minimum condition as the core is moved through the optimum position. In this manner, very precise tuning of each of the traps is possible.

It may thus be seen that the present invention eliminates the need to clamp the AGC since the video signal includes the standard sync and blanking pulses to which the AGC circuit of the receiver responds. Moreover, the I.F. circuits can be operated at higher levels than could be used in the past, and the television screen itself is used to monitor the video output from the video detector thus eliminating the neeed to use an oscilloscope for this purpose.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. A method of tuning the operating frequency of a trap in the video I.F. amplifier of a television receiver, comprising the steps of
    generating a video carrier having the standard video I.F. carrier frequency,
    modulating said video carrier with a video pattern signal to provide a first video modulated carrier,
    generating a second video carrier having the frequency to which said trap is to be tuned,
    modulating said second video carrier with a video frequency signal different from said video pattern signal to provide a second video modulated carrier,
    applying said first and second video modulated carriers to the input of said video I.F. amplifier, and
    adjusting the operating frequency of said trap to attenuate the level of the video modulated second video carrier while observing said video pattern on the screen of said television receiver until any observable interference of said video frequency signal with said pattern is minimized.

2. A method according to claim 1, further comprising the step of
    modulating sync and blanking pulses on said video carrier.

3. A method according to claim 2, further comprising the step of
    adjusting the amplitude of said second modulated carrier to optimize the observability of said interference on said screen.

4. Apparatus for use in monitoring the operation of a trap in a video I.F. amplifier, comprising
    means for generating a first carrier at the video I.F. frequency of said amplifier,
    means for modulating said first carrier with a video pattern signal,
    means for generating a second carrier at the frequency which said trap is intended to trap,
    means for modulating said second carrier with a video signal different from said video pattern signal, and
    means for adding the modulated first carrier to the modulated second carrier.

5. Apparatus according to claim 4, comprising
    means for adjusting the level of the modulated second carrier prior to its being combined with the modulated first carrier.

6. Apparatus for use in monitoring the operation of a plurality of traps in a video I.F. amplifier, comprising
    means for generating a first carrier at the video I.F. frequency of said amplifier,
    means for modulating said first carrier with a video pattern signal and with picture control signals to provide a video modulated I.F. carrier,
    means for generating a plurality of second carriers respectively having the frequencies said traps are intended to trap, modulating means for modulating signals applied to a pair of inputs thereof, means for applying a video signal to one of said pair of inputs, switch means for applying a selected one of said second carriers to the other of said pair of inputs, and means for adding the output of said modulating means to said video modulated I.F. carrier.

7. Apparatus according to claim 6 comprising adjustable attenuator means interconnected between said modulating means and said means for combining.

8. Apparatus according to claim 7 wherein said carriers have respective frequencies of 39.75 Mhz, 41.25 Mhz, and 47.25 Mhz.

9. Apparatus according to claim 8 wherein said video signal has a frequency of about 1 Khz.

* * * * *